United States Patent [19]

Takikawa

[11] Patent Number: 5,143,410
[45] Date of Patent: Sep. 1, 1992

[54] BRANCH CONNECTORS FOR HIGH-PRESSURE BRANCHED FUEL PIPE

[75] Inventor: Kazunori Takikawa, Numazu, Japan

[73] Assignee: Usui Kokusai Sangyo Kaisha Ltd., Japan

[21] Appl. No.: 721,286

[22] Filed: Jun. 26, 1991

[30] Foreign Application Priority Data

Jun. 30, 1990 [JP] Japan .................................. 2-173848

[51] Int. Cl.⁵ .............................................. F16L 41/12
[52] U.S. Cl. .................................. 285/197; 285/334.4
[58] Field of Search ................ 285/905, 334.5, 197, 285/334.4

[56] References Cited

U.S. PATENT DOCUMENTS

| Re. 6,488 | 6/1875 | Van Duzer. | |
|---|---|---|---|
| 966,870 | 8/1910 | Stoddard. | |
| 1,398,985 | 12/1921 | Wadley | 285/334.4 X |
| 1,806,450 | 5/1931 | Ercanbrack | 285/334.4 X |
| 2,098,669 | 11/1937 | Moffitt. | |
| 2,360,359 | 10/1944 | Meyers. | |
| 3,036,674 | 5/1962 | Branin. | |
| 3,437,357 | 4/1969 | Rubin. | |
| 4,073,513 | 2/1978 | Blakely. | |
| 4,540,205 | 9/1985 | Watanabe. | |
| 4,832,376 | 5/1989 | Sugao. | |
| 4,893,601 | 1/1990 | Sugao. | |
| 4,900,180 | 2/1990 | Takikawa. | |

FOREIGN PATENT DOCUMENTS 2334445  5/1974  Fed. Rep. of Germany.
312039   6/1969  Sweden .......................... 285/334.4

Primary Examiner—Dave W. Arola
Attorney, Agent, or Firm—Anthony J. Casella; Gerald E. Hespos

[57] ABSTRACT

Branch connectors connected with a high-pressure branched fuel tube forming a fuel supply passage to a Diesel engine. Each connector has a circulation passage through which high-pressure fuel circulates. The passage extends axially within the main pipe. Holes extend through the wall defining the passage. Pressure-receiving seat surfaces are formed, each around an opening in the outer surface of the main pipe. The diameter of the opening increases outwardly. Each connector has a fluid passage in communication with the circulation passage, as well as a push head portion bearing on the corresponding seat surface. Coupling metal fittings surround the main pipe. The connectors are screwed to their respective fittings, for fastening the connectors to the main pipe. The bearing portion of each push head portion is a substantially spherical surface whose center is located on the axis of the connector. The bearing portion of the seat surface is a curved surface that is symmetrical with respect to the axis of the corresponding hole. The curved surface is in contact with the spherical surface on a line. The distance l of the inner surface of the main pipe from the intersection of said line and the plane which runs across the axis of the corresponding hole and parallel to the axis of the main pipe is so set that the relations $1/5\,T < l < \tfrac{3}{4}\,T$ hold, where T is the thickness of the wall of the main pipe.

6 Claims, 6 Drawing Sheets

BRANCH CONNECTORS FOR HIGH-PRESSURE BRANCHED FUEL PIPE

BACKGROUND OF THE INVENTION

1. Field of the Invention

The present invention relates to the structure of a branch connector, such as a branch pipe or branch metal fitting, which is for use with a high-pressure branched fuel pipe and, more particularly, to the structure of a branch connector for use with a high-pressure branched fuel pipe whose inside pressure is in excess of 1000 kg f/cm² and which acts as a fuel supply passage to a Diesel engine.

2. Description of the Prior Art

FIG. 10 is a side elevation partially in cross section of a conventional branch connector for use with a high-pressure branched fuel ppe, for showing the structure of the connector. As an example, this branch connector is a branch pipe. The main pipe is indicated by reference numeral 11. A circulation passage 10 through which high-pressure fuel circulates is formed in the main pipe 11. A plurality of holes 13 (only one is shown in FIG. 10) extend perpendicularly to this circulation passage 10. The holes 13 are spaced from each other along the axis of the circulation passage 10.

A branch pipe 14 is fitted in each hole 13. The branch pipe 14 is brazed or welded to the drain pipe 11 at the junction w between them. The circulation passage 10 in the main pipe 11 is in communication with a fluid passage 12 formed inside the branch pipe 14.

Ultrahigh pressure exceeding 1000 kg f/ cm² is repeatedly supplied to the above-described branch connector for use with the high-pressure branched fuel pipe. Moreover, vibration is transmitted to the connector from the Diesel engine. Therefore, the junction w or its vicinities affected by heat tend to crack, or the connector is broken down, permitting the fuel to splash or leak out. Also, the branch pipe 14 may be disconnected.

SUMMARY OF THE INVENTION

In view of the foregoing problems with the structure of the conventional branch connector of this kind, it is an object of the present invention to provide branch connectors which are for use with a high-pressure branched fuel pipe, are capable of being easily connected with the main pipe without relying on welding or brazing while maintaining the airtightness, and prevent the connection from being spoiled even if ultrahigh pressure is repeatedly supplied to them or vibration is transmitted to them from a Diesel engine.

The above object is achieved in accordance with the teachings of the invention by a combination of branch connectors and a high-pressure branched fuel pipe, said combination comprising: a circulation passage through which high-pressure fuel circulates, the passage extending axially within a main pipe; a plurality of holes extending through the wall defining the circulation passage, the holes being spaced from each other axially of the passage; pressure-receiving seat surfaces each formed around an opening which is formed in the outer surface of the main pipe and the diameter of which increases outwardly of the main pipe to permit the branch connectors to be juxtaposed on the hcles, each branch connector having a fluid passage in communication with the circulation passage, each branch connector having a push head portion at its one end, the push head portion bearing against the pressure-receiving seat surface; coupling metal fittings which arc mounted so as to surround the main pipe and to which their respective branch connectors are screwed, for fastening the branch connectors to the main pipe; the bearing portions of the push head portions being substantially spherical surfaces whose centers are located on the axes of their respective branch connectors; the bearing portion of each pressure-receiving seat surface being a curved surface that is symmetrical with respect to the axis of the corresponding hole, the curved surface being in contact with the corresponding one of the spherical surfaces on a line; the distance of the inner surface of the main pipe from the intersection of said line and the plane which runs across the corresponding hole and parallel to the axis of the main pipe being so set that the relations $1/5\ T < 1 < \frac{3}{4}\ T$ hold, where T is the thickness of the wall of the main pipe.

Preferably, the distance is so set that the relations $\frac{1}{4} T < 1 < \frac{2}{3} T$ are satisfied. More preferably, the relations $\frac{1}{3} T < 1 < \frac{1}{2} T$ are satisfied.

In accordance with the present invention, the substantially spherical push seat surface at the front end of each push head portion is in contact with the curved surface of the corresponding pressure-receiving seat surface on a line The plane which runs across the axis of the corresponding one of the holes and parallel to the axis of the main pipe meets this line at intersections. The distance l of the inner surface of the main pipe from each of these intersections is so set that the relations $1/5\ T < 1 < \frac{3}{4}\ T$ hold, where T is the thickness of the wall of the man pipe. Therefore, when the seal is pressed, the inner fringes of the holes are prevented from deforming. Also, the holes are prevented from being deformed circumferentially of the main pipe on the side of the outer surface of the main pipe. Hence, the performance of the seals does not deteriorate. This eliminates the possibility that the fuel splashes.

Since the substantially spherical push seat surface is formed at the front end of the push head portion iormed at one end of each branch connector, if the connector tilts toward the main pipe at all, the push seat surface is kept in contact with the pressure-receiving seat surface on the circular line. This ensures the airtightness between the contacted portions.

If the branch connector tilts slightly, then the substantially spherical push seat surface is caused to slide on the curved pressure-receiving seat surface by the torque produced by tightening the tightening nut. As a result, the tilt of the branch connector is automatically corrected.

Other objects and features of the invention will appear in the course of the description thereof which follows.

DETAILED DESCRIPTION OF THE PREFERRED EMBODIMENTS

Figure 3:
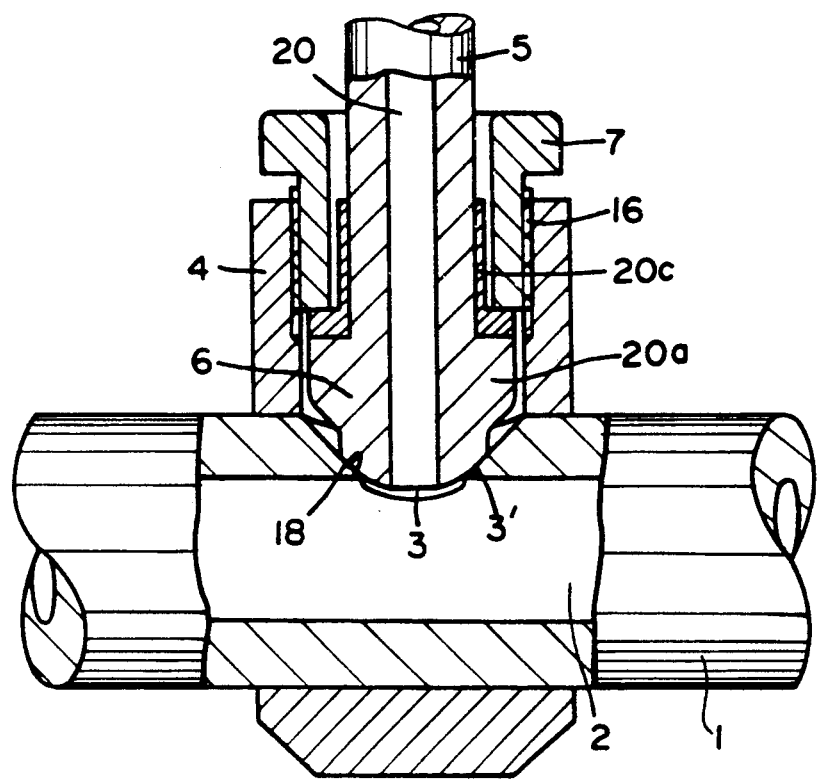
FIG. 3 is a side elevation in cross section of the whole of a branch connector according to the invention.
Figure 4:
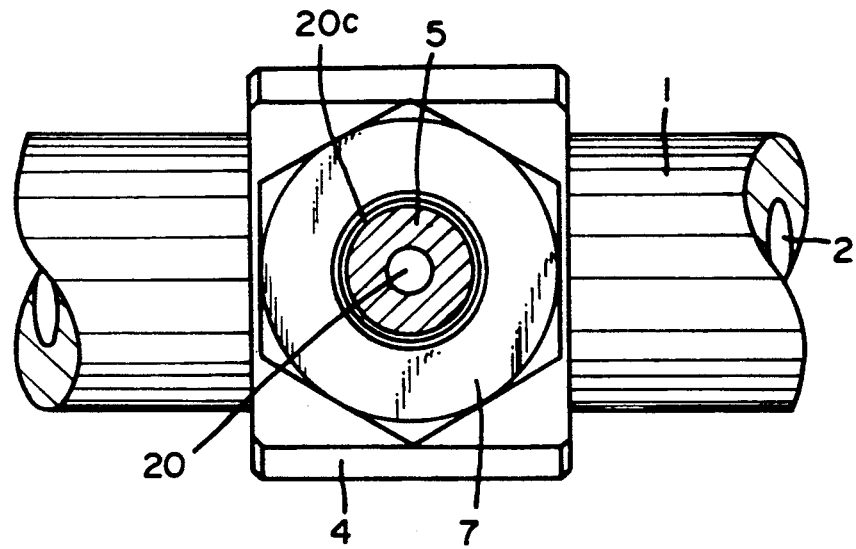
FIG. 4 is a plan view of the branch connector shown in FIG. 3.

Referring to FIGS. 3 and 4. there is shown a high-pressure branched fuel pipe having a main pipe 1. A branch pipe 5 acting as a branch connector extends at right angles to the axis of the main pipe 1, and is tightened against a coupling metal fitting 4 by a nut 7. As an example, the main pipe 1 is a relatively thick-walled metal tube having an outside diameter of 20 mm and a wall thickness of 6 mm. As shown in FIG. 3, the main pipe 1 is provided with a circulation passage 2. A hole 3 extends through the wall forming the circulation passage 2. The diameter of the hole 3 increases outwardly of the main pipe 1. A conical pressure-receiving seat surface 3' is formed at the inner end of the hole 3. The curved seat surface S is symmetrical with respect to the axis of the hole 3. The aforementioned coupling metal fitting 4 is mounted around the main pipe 1 and surrounds the seat surface 3'. This fitting 4 has an internally threaded hole 10.

The branch pipe 5 has a push head portion 6 at its front end. A genuinely spherical push seat surface 18 is formed at the front end of the push head portion 6. An annular protrusion 20a is formed on the push seat surface 18.

The branch pipe 5 is mounted to the main pipe 1 in the manner described now. The push seat surface 18 of the push head portion 6 of the branch pipe 5 is disposed opposite to the pressure-receiving seat surface 3'. A sleeve 20c is mounted on the annular protrusion 20a. The nut 7 is then screwed into the internally threaded hole 16 so that the sleeve 20c may be pressed against the annular protrusion 20a. Thus, the branch pipe 5 is mounted to the main pipe 1.

In this way, the push seat surface 18 is pressed against the pressure-receiving seat surface 3'. The circulation passage 2 in the main pipe 1 hermetically branches out into the fluid passage 20 in the branch pipe 5. In this case, a seal member such as packing made of copper or other material can be sandwiched between the push head portion 6 and the pressure-receiving surface 3'.

Figure 5:
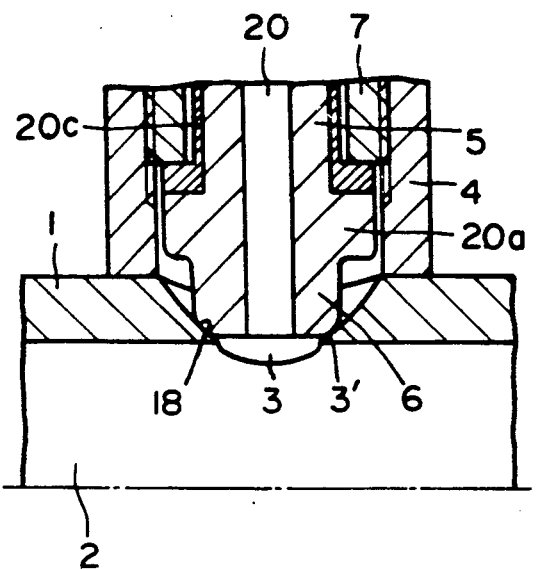
FIG. 5 is a cross-sectional view of main portions of another branch connector according to the invention.

Referring next to FIG. 5, there is shown another example which is similar to the example described already in connection with FIGS. 3 and 4 except for the following points. The push head portion 6 has a substantially cylindrical contour. The push seat surface 18 that bears against the pressure-receiving seat surface 3' is shaped into a spheroid whose center is located on the axis of the branch pipe 5. The pressure-receiving seat surface 3' is shaped into a substantially spherical surface whose center lies on the axis X of the hole 3.

Figure 6:
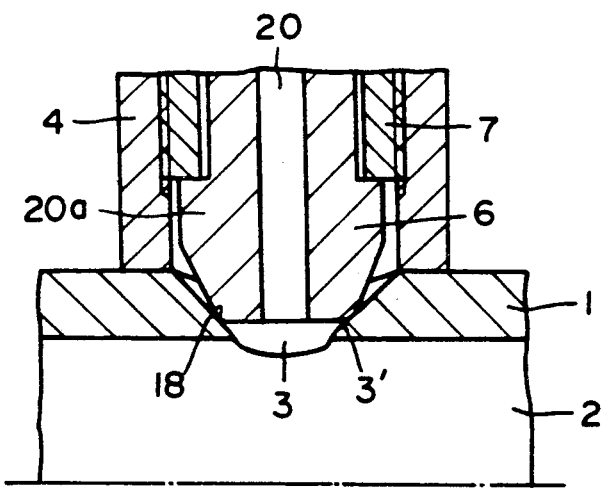
FIG. 6 is a cross-sectional view of main portions of a further branch connector according to the invention.
Figure 7:
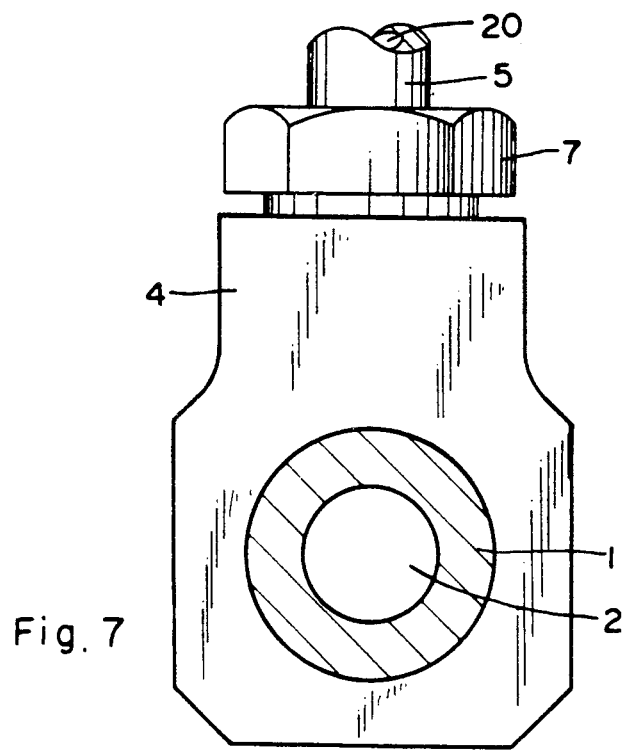
FIG. 7 is a front elevation of a branch connector, including the cross sections of FIGS. 5 and 6.

Referring next to FIG. 6, there is shown another example which is similar to the example described already in conjunction with FIGS. 3 and 4 except for the following points. The sleeve mounted on the annular protrusion 20a is omitted. The contour of the push head portion 6 is a cone cut vertical to the axis at the front end. The push seat surface 18 is a truncated conical surface whose center is located on the axis of the branch pipe 5. The pressure-receiving seat surface 3' is a conical surface whose center is located on the axis of the hole 3.

In the above examples, the pressure-receiving seat surfaces 3' are spherical and conical, respectively. These surfaces are collectively referred to herein as curved surfaces. In the above descriptions, the push seat surfaces 18 are genuinely spherical, spheroidal, and truncated conical, respectively. It is to be noted that the invention is not limited to these surfaces. A paraboloid of revolution, a hyperbola of revolution, and so forth, and combinations thereof are also possible. These and above-described surfaces are collectively referred to herein as substantially spherical surfaccs.

Figure 1:
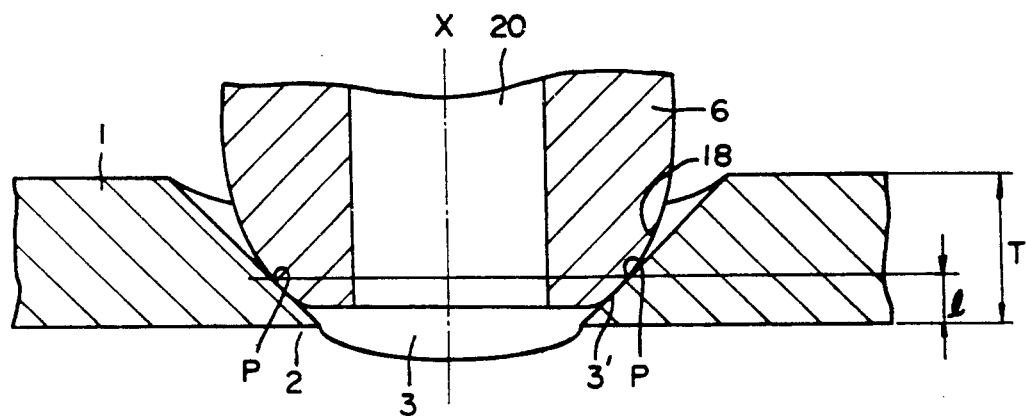
FIGS. 1 and 2 are fragmentary cross sections of branch connectors according to thc nvention, for showing the condition in which a push head portion is in contact with a pressure-receiving seat surface.
Figure 2:
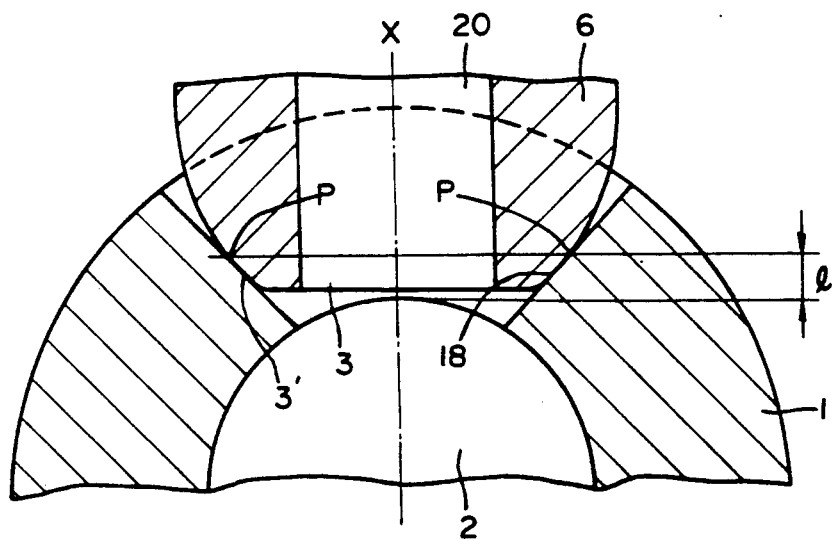
Figure 11:
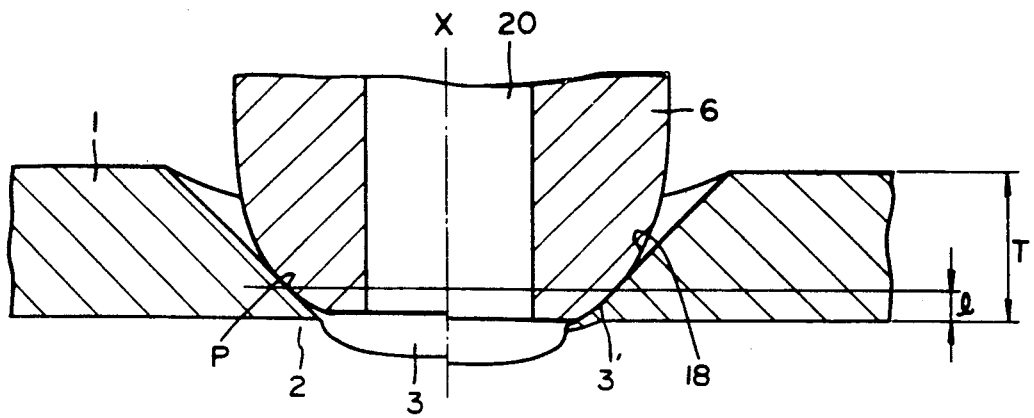
FIGS. 11 and 12 are fragmentary cross sections of branch connectors, for showing the condition in which a push head portion is in contact with a pressure-receiving seat surface out of the range definning the invention.
Figure 12:
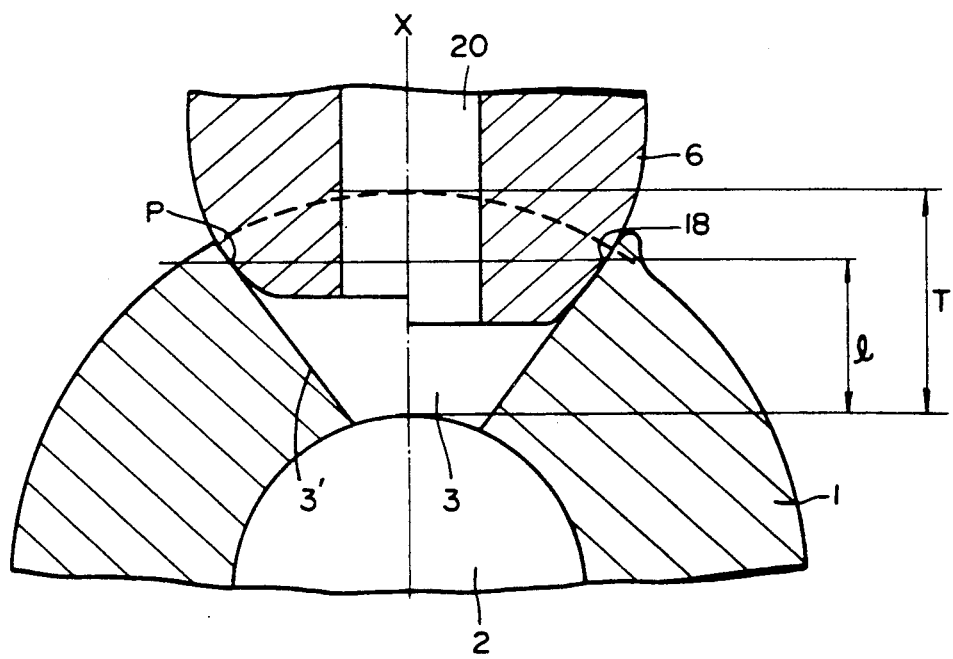

In the above examples, the push seat surface 18 of the push head portion 0 is in contact with the pressure-receiving seat surface 3' on lines P, as shown in FIGS. 1 and 2. Each contact line P meets with the plane which runs across the axis X of the hole 3 and parallel to the axis of the main pipe 1 at intersections. The distance l between each intersection and the inner surface of the main pipe 1 is so set that the relations $1/5\ T < l < \frac{1}{2}\ T$ hold, where T is the wall thickness of the main pipe 1. If this distance l is less than $1/5\ T$, then the inner fringe of the hole 3 is easily deformed Especially, the portion of the fringe which is on the side of the axis of the main pipe 1 tends to the deformed, spoiling the seal as shown in FIG. 11. This creates a possibility that the fuel splashes. If the distance l is in excess of $\frac{3}{4}\ T$, then the hole 3 is easily deformed circumferentially of the main pipe 1 on the side of the outer surface of the main pipe as shown in FIG. 12. This leads to a reduction in the surface pressure. As a result, the performance of the seal can deteriorate, causing splashing of the fuel, in the same way as in the foregoing.

The present invention set the distance l to various values according to various values of the wall thickness T, and repeated an experiment on the performance of the seal. The inventor has found that when the relations $1/5\ T < l < \frac{1}{2}\ T$ were met, the pressure-receiving seat surface 3' was least deformed and that the circumferential variations in the width of the contact lines P were small. The experiments have revealed that if the relations $\frac{1}{4}\ T < l < \frac{1}{3}\ T$ are satisfied, then the performance of the seal is improved further, and that if the relations $\frac{1}{3}\ T < l < \frac{1}{2}\ T$ are fulfilled, then the optimum seal characteristics are obtained most stably.

In this way, the distance of the inner surface of the main pipe 1 from the intersections of the contact lines P and the plane passing across the axis X of the hole 3 and parallel to the axis of the main pipe 1 is set within the optimum range according to the wall thickness T of the main pipe 1. On the contact lines P, the push seat surface 18 of the push head portion 6 is in contact with the pressure-receiving seat surface 3'. Therefore, the inner fringe of the hole 3 is prevented from being deformed. Also, the hole 3 is prevented from being deformed circumferentially of the main pipe 1 on the side of the outer surface of the main pipe. Hence the performance of the seal is completely prevented from deteriorating.

Figure 8:
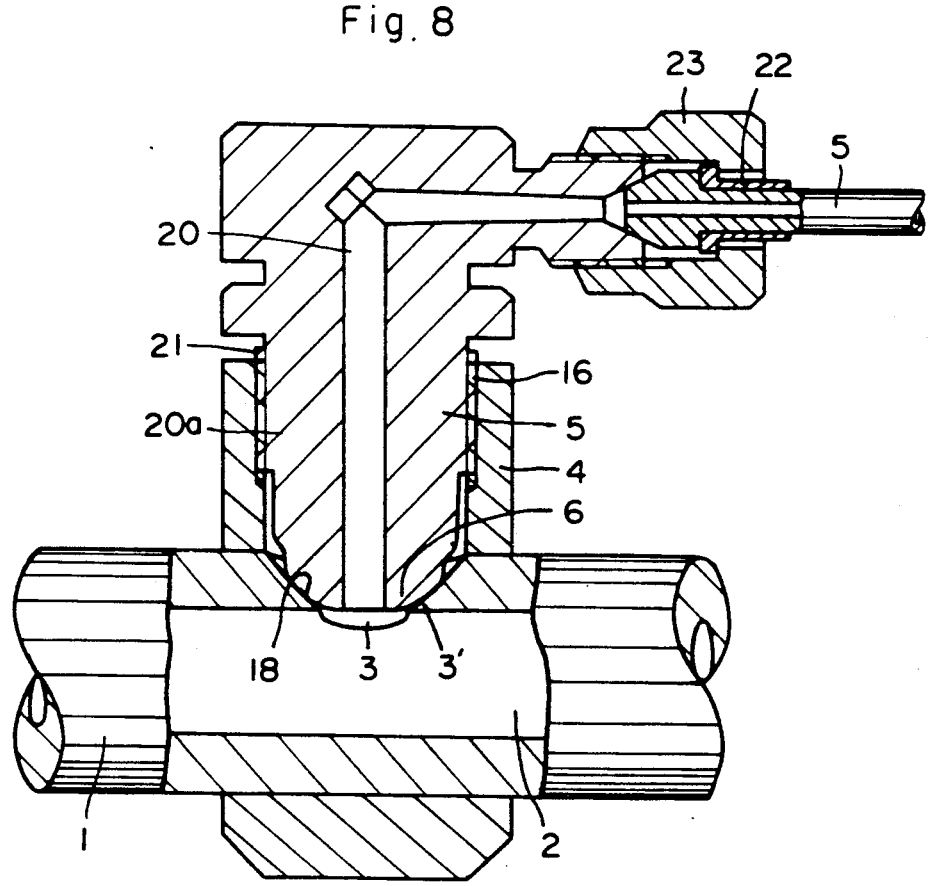
FIGS. 8 and 9 are cross-sectional views of yet other branch connectors according to the invention.

In the examples described thus far, the branch pipe 5 is used as a branch connector. The invention is also applicable to the case in which an elbow is used to prevent the branch pipe 5 from interfering with other components, which would normally be caused when the branch pipe 5 is bent at a large curvature. In addition, the invention can also be applied to the case in which a branch metal fitting 5' as shown in FIG. 8 is employed, taking account of the installation of a constant pressure valve, pressure reducing valve, delivery valve, discharge valve, or the like.

In particular, the branch metal fitting 5' has a substantially spherical push seat surface 18 at its one end, in the same way as in the above examples. An external thread 21 is formed on the outer surface of the fitting 5'. The thread 21 is screwed into an internally threaded hole 16 formed in a coupling metal fitting 4. Thus, the fitting 5' is caused to bear against the pressure-receiving seat surface 3' of the main pipe 1. A cap nut 23 is screwed to the other end via a sleeve 22. In this manner, the fastened branch pipe 5 is connected.

Figure 9:
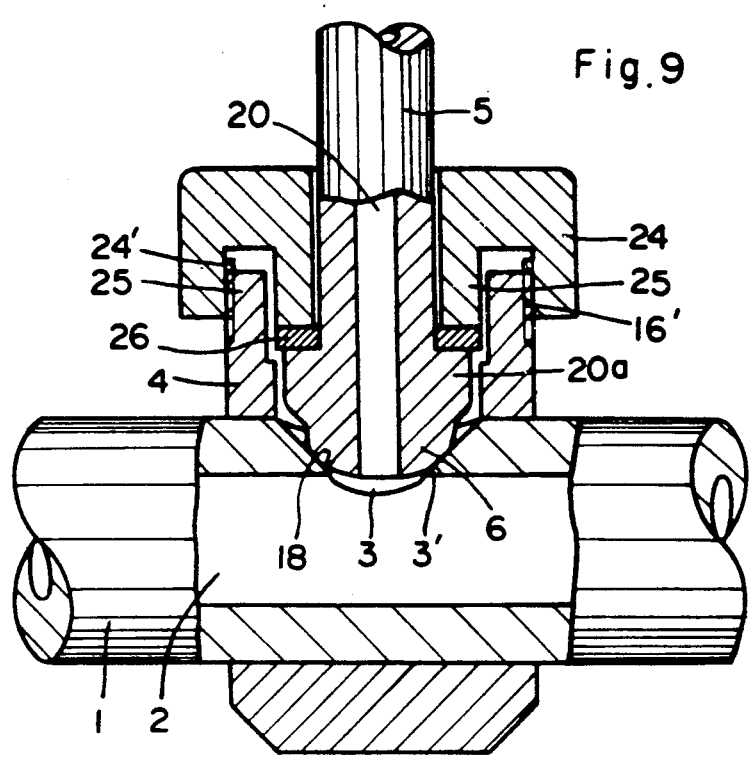
Figure 10:
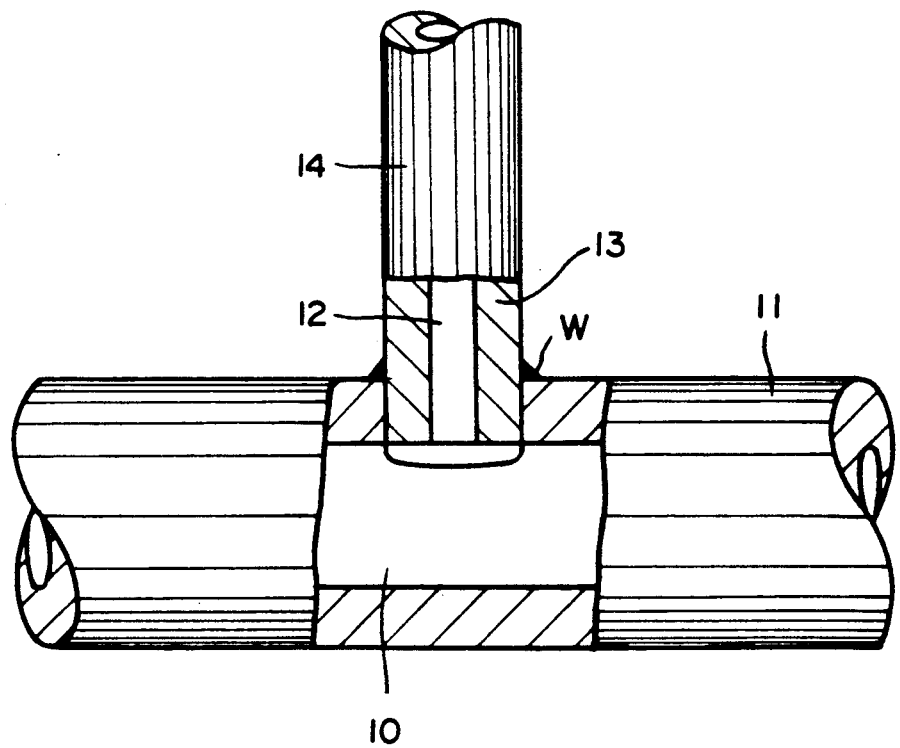
FIG. 10 is a side elevation in cross section of the prior art high-pressure branched fuel pipe.

A cap nut 24 as shown in FIG. 9 can also be used. A cylindrical protrusion 25 is formed in the center of the cap nut 24. An internal thread 24' is formed in the nut 24. An external thread 16' is formed on the outer surface of a coupling metal fitting 4. As the internal thread 24' is screwed to the external thread 16' on the coupling fitting 4, the protrusion 25 causes a washer 26 to push downward against the annular protrusion 20a. Thus, the push seat surface 18 is made to bear against the pressure-receiving seat surface 3'.

In ths example, Lhe push seat surface 18 of the push head portion 6 is made substantially spherical and brought into contact with the pressure-receiving seat surface 3' on a circular line. The seat surface 3' is a curved surface that is symmetrical with respect to the axis X of the hole 3. Therefore, if the branch connector 5 tilts at all, the contact made by the curved surface on the circular line maintains the airtightness. Furthermore, tilt of the branch connector 5 and the branch metal fitting 5' is automatically corrected by their centering action. Consequently, leakage of the fuel can be prevented.

As described in detail thus far, in accordance with the present invention, if ultrahigh pressure of fuel is applied repeatedly or vibration is transmitted from a Diesel engine, neither splash nor leakage of the fuel occurs. Also, separation of the connector is prevented. Especially, deforma tion of the inner fringe of the hole and circumferential deformation of the hole on the side of the outer surface of the main pipe are prevented, since the distance of the inner surface of the main pipe from the line on which the push seat surface is in contact with the pressure-receiving seat surface is set within the optimum range according to the wall thickness of the main pipe. In consequence, deterioration of the seal can be prevented completely. Further, because the push seat surface is spherical, if the branch connector is tilted, the tilt can be corrected automatlcally by tightening the tightening nut. Additionally, the branch connector can be fastened to the main pipe while maintaining the airtightness by performing only a simple operation.

What is claimed is:

1. A combination of branch connectors and a high-pressure main fuel pipe, said combination comprising:
   a main pipe having a generally cylindrical wall with opposed inner and outer surfaces, the inner surface defining an axially extending circulation passage through which high-pressure fuel circulates, the wall defining a radially thickness T extending from the inner surface to the outer surface thereof;
   a plurality of holes extending radially through the wall of the main pipe and communicating with the circulation passage, the holes being spaced from each other axially of the passage;
   pressure-receiving seat surfaces each formed around a respective one of the holes of the main pipe, the pressure-receiving seat surfaces defining curved surfaces symmetrical about a radius of the main pipe extending centrally through the respective hole and the diameter of the curved pressure receiving sent surface increasing at radially outwardly disposed locations on the wall of the main pipe, the branch connectors being juxtaposed on the holes, each said branch connector having a fluid passage extending axially therethrough and being in communication with the circulation passage of the main pipe, the push head portion bearing against the pressure-receiving seat surface;
   coupling metal fittings mounted to surround the main pipe, each said coupling metal fitting having threads for fastening the branch connectors to the main pipe;
   the push head portions of the respective branch connectors being substantially spherical surfaces having centers located on the axes of the respective branch connectors;
   the spherical push head portion of each branch connector contacting the respective pressure-receiving seat surface on a line;
   the spherical push heads and the curved pressure-receiving seat surfaces being dimensioned such that a distance l from the inner surface of the main pipe to said line of contact between the spherical push head portion of each branch connector and the respective curved pressure-receiving seat surface is such that the relations $1/5\,T < l < \frac{3}{4}\,T$ hold whereby efficient sealing between the branch connectors and the main pipe is achieved without deterioration to the main pipe at the inner and outer surfaces thereof.

2. The combination as set forth in claim 1, wherein the distance l and the thickness T of the wall of the main pipe are so set that the relations $\frac{1}{4}\,T < l < \frac{2}{3}\,T$ are satisfied.

3. The combination as set forth in claim 2, wherein the distance l and the thickness T of the wall of the main pipe are so set that the relations $\frac{1}{3}\,T < l < \frac{1}{2}\,T$ are satisfied.

4. The combination as set forth in claim 1, wherein a seal member is sandwiched between the push head portion of each branch connector and the corresponding pressure-receiving surface.

5. The combination as set forth in claim 1, wherein each branch connector consists of a branch pipe.

6. The combination as set forth in claim 1, wherein each branch connector consists of a branch metal fitting having threads thereon for direct interengagement with one said coupling metal fitting.

* * * * *